No. 898,290. PATENTED SEPT. 8, 1908.
E. F. WAGNER.
COLOR STUDY DEVICE.
APPLICATION FILED NOV. 5, 1907.
2 SHEETS—SHEET 2
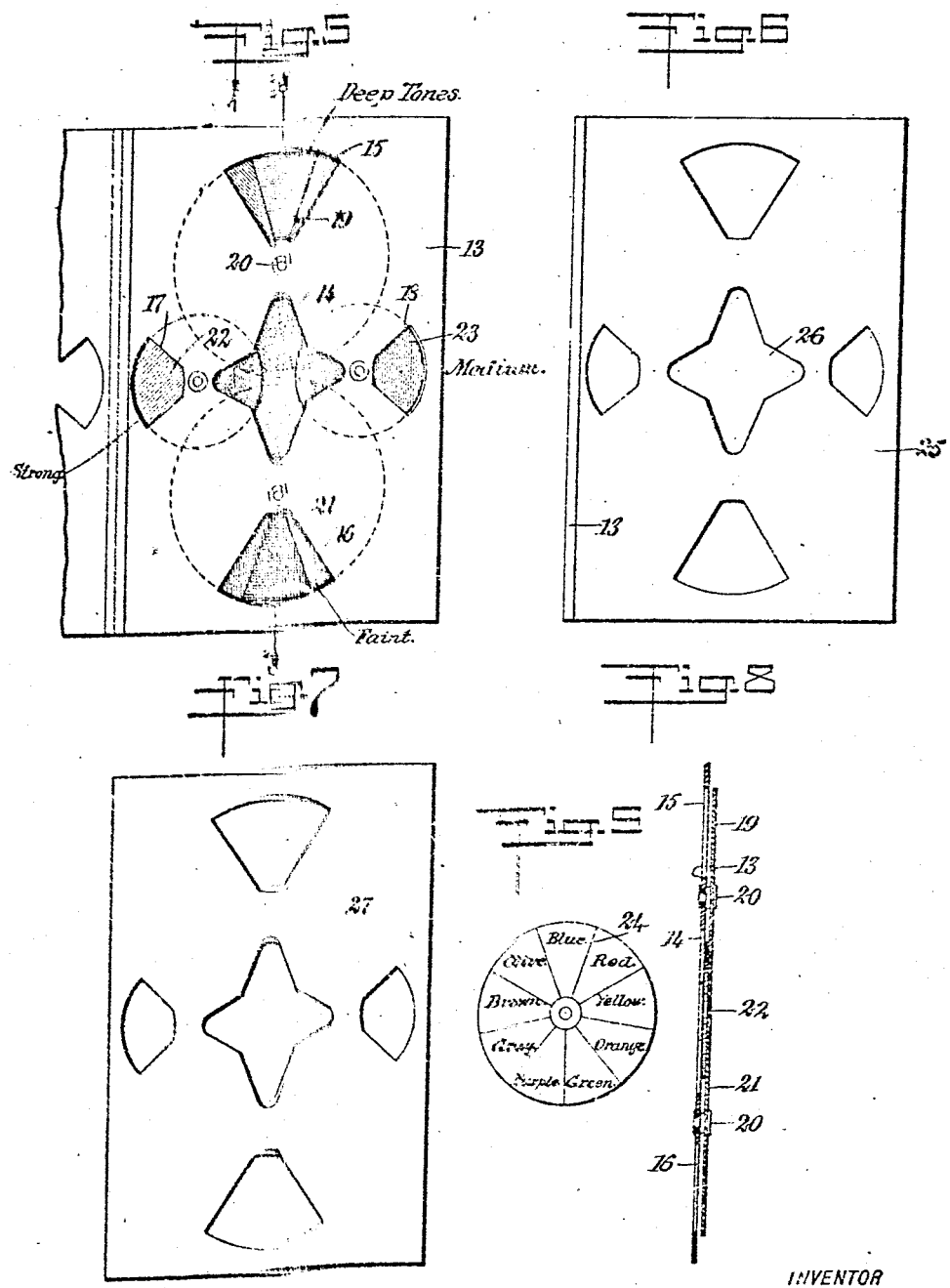
INVENTOR
Emanuel F. Wagner
BY
ATTORNEYS

UNITED STATES PATENT OFFICE.

EMANUEL FREDERICK WAGNER, OF NEW YORK, N. Y.

COLOR-STUDY DEVICE.

No. 898,290.  Specification of Letters Patent.  Patented Sept. 8, 1908.

Application filed November 5, 1907. Serial No. 400,807.

REISSUED

*To all whom it may concern:*

Be it known that I, EMANUEL F. WAGNER, a citizen of the United States, and a resident of the city of New York, borough of Manhattan, in the county and State of New York, have invented a new and Improved Color-Study Device, of which the following is a full, clear, and exact description.

This invention relates to a device for studying colors.

Many persons who employ colors are deficient in their faculties of comparing or harmonizing colors.

The object of this invention is to provide a device adapted to be used by such persons and by students of color, for comparing different colors or placing them in different arrangements, enabling contrasting colors to be exhibited or harmonizing colors to be placed in o; position.

A further object of the invention is to provide means for arranging a plurality of colors adjacent to each other so that their artistic effect may be studied.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a front elevation of the device, certain parts being broken away or removed; Fig. 2 is a rear elevation of a frisket which constitutes a feature of the invention; Fig. 3 is a front elevation of the complete device; Fig. 4 is a vertical section through the device; Fig. 5 is a front elevation of another form of the device, showing an arrangement for studying different combinations of colors; a part of this view is broken away; Fig. 6 is a front elevation of a shield which is colored and adapted to be used in connection with the device shown in Fig. 5, so as to give a ground for the arranged colors; Fig. 7 is a view of a reversible shield having a different color on each side, and adapted to be used with the device shown in Fig. 5; Fig. 8 is a vertical section on the line 8—8 of Fig. 5; and Fig. 9 is an elevation of the color wheel or disk, several of which are shown in Fig. 5.

Proceeding, now, to a detailed description of the parts, it should be stated at the outset, that the device illustrated in Figs. 1 to 4 is intended for the purpose of studying the harmony and contrast of colors; it also enables a limited study of color arrangement or combination.

Referring more particularly to the parts, 1 represents the body or back of the device, which consists of a rectangular plate having guide flanges 2, formed at the longitudinal edges thereof as shown. In this back are mounted four color scales indicated collectively by the numeral 3. The color scale $3^a$ at the left has deep tones, while the next scale $3^b$ to the right has strong tones; the scale $3^d$ at the extreme right has faint tones, while the scale $3^c$ just to the left of the right-hand scale has medium tones. These scales are provided on their outer faces with colors arranged as indicated in Fig. 1. Beginning at the top, the colors are as follows: yellow, blue, red, yellow, orange, green, purple, gray, brown, olive, sage, buff and drab. The colors, yellow, blue, red constitute the primary colors, while the colors orange, green and purple constitute the secondary; the colors olive, brown and gray are the tertiary colors, while the sage, buff and drab are quadrant colors. This arrangement is illustrated graphically in Fig. 1. These strips or scales 3 are adapted to slide up or down in the back 1, which constitutes a guide for them, as will be readily understood. However, they normally occupy the fixed relation shown in Fig. 1. Over these color scales there is slidably mounted a shield 4 which shield consists of a rectangular sheet or plate having two transverse slots 5 and 6 which extend completely across the combined width of the scales 3 and expose the colors thereof to view. This shield affords means for studying the colors of the scales in harmony or in contrast. When contrast colors are to be studied, one of the slots or openings is placed in an intermediate position (as indicated by the dotted line 7) with respect to the colors; that is, it will be disposed directly over the dividing line between two contrasting colors. For instance, the contrasting colors blue and red may be exposed by means of the upper slot 5 so that the lower portion of the blue is visible and the upper portion of the red, the adjacent colors being screened from view. In this way the artistic effect of the colors in contrast can be studied in their various degrees of tone or strength. If harmonizing colors are to be studied, the shield 4 is placed so as to expose only one of the color scales at one of the slots, whereupon the slot 6 will be found to lie over a harmonizing color. For instance, as illustrated in Fig. 1, the upper slot 5 exposes the color orange while the lower slot exposes the color gray. The distance between the slots is such and the arrangement of the colors of the scales is such, that the harmonizing color for any particular color is at once found by placing one of the slots over either of the colors. As indicated, the width of the slots is the same as the width of the colors or zones of the scales.

Where it is desired to study the contrasting or harmonizing colors as they will appear upon ground of any particular color, I employ a frisket or overlay 8 shown in Fig. 2. This frisket consists simply of a rectangular sheet or plate, adapted to lie over the shield 4 and having a plurality of slots 9 formed therein, said slots being equal in length and width to the slots 5 and 6 aforesaid. The distance between these slots is substantially the same as the width of the slots, or slightly greater, and the arrangement of the slots is such that if one of the slots is brought into alinement with the slot 5, the slot 6 in the shield will then be covered by one of the bars 10 between the slots 9. In this way by sliding the frisket, either of the slots 5 or 6 may be covered, so that there will be only one band of color visible. This arrangement is illustrated in Fig. 4, where the upper slot 5 is covered by one of the bars 10 and the lower slot 6 is uncovered so as to expose the colors of the scales beneath. The slots or openings 9 are formed around their edges with bands 11 of different colors, the upper one being black, the next one white, the next one buff, the next gray and the next brown, as illustrated in Fig. 3. With this arrangement, by slipping the frisket up or down, any colors of the scale can be shown in harmony or contrast upon a ground having any of the colors black, white, buff, gray or brown.

As stated above, the colors vary in tone from the left toward the right, the deepest tones being at the left. I provide the deep toned scale 3ª with a double "X" which is the symbol which I employ in the color system which I use. The strong tone of the scale is provided with a single "X" for the same purpose, and the medium scale with a zero, while the scale at the right is provided with two zeros, which is the symbol for the faint colors. By having the scales 3 mounted so that they can be slipped longitudinally in the back 1, it becomes possible to change the horizontal arrangement of the colors; for instance, the scale at the extreme right may be pulled down so as to bring the faint blue in alinement with the medium orange. In this way, evidently, different horizontal combinations of colors may be studied with or without a ground of any color which is carried by the frisket. The possibility of sliding the scales as described is illustrated by the dotted lines 12 in Fig. 3.

It will be noted from an examination of Fig. 1, that the primary colors do not begin at the top of the scales; the first color of the scales is yellow, which is just above blue. This yellow is identical in shade with the yellow color of the primary group, but is placed at this point so as to enable the blue to be studied in contrast with yellow.

Referring, now, to the device illustrated in Figs. 5 to 9, I provide a plate or sheet 13 of rectangular form, provided with a central opening 14 and openings 15, 16, 17 and 18 near the four edges or sides of the plate. The central opening 14 has substantially the form of a Greek cross having tapering arms. Between the openings 14 and 15 a color disk 19 is attached upon a pivot 20. Between the openings 16 and 14 a similar color disk 21 is pivoted; likewise, on each side of the central opening, I provide smaller color disks 22 and 23 which are pivoted as shown. The arrangement is such that the edges of the color disks all pass under the opening 14. The disks are provided with radial lines 24, as illustrated in Fig. 9, which divide the colors into equal spaces of segmental form; the arrangement of the colors is that shown, being arranged in rotation in the same order as in the scales shown in Fig. 1. The pivots 20 at which the disks are attached, have the form of a snap button or any similar well known device, enabling the disks to be attached or removed when desired.

To the plate 13 a leaf or shield 25 is hinged at the edge, and this shield is provided with openings 26 which register with the openings of the plate. This shield will have any desired color, and may be folded over the plate so as to study the effect of a different ground. In addition to this, I provide a reversible extra shield or overlay 27, which is like the shield 25 except that it has a different color on each side; any colors may be selected for this purpose. It should be understood, also, that the plate 13 has some color suitable for a ground. In practice, I provide two of the overlays 27, one of which is black on one side and white on the other; the other overlay is buff on one side and brown on the other. It will be evident that by rotating the disks attached to the plate 13, any desired color arrangement can be brought about at the central opening 14. The arrangement of the colors on the disks are the same, but they are of different tones, the disk 19 having deep tones, while the disk 23 has medium tones. The disk 22 carries strong tones, and the disk 21 faint tones. At the openings 15 to 18 the contrasting colors may be studied by bringing them under the openings. The action of this device in this respect is similar to the action of the shield 4 when it is slid upon the scales 3. It will be noted that in this form of the invention the colors may be shown in contrast or in harmony, as in the first form described, the purpose and effect of both forms being the same.

Having thus described my invention, I claim as new and desire to secure by Letters Patent:

1. A device of the class described having a plurality of movable color scales, a shield with an opening adapted to expose the colors, and an overlay having a ground color and having an opening registering with said first opening.

2. A device of the class described having a color scale, and a movable shield having transverse openings, said scale having such an arrangement that when a color is exposed at one opening the harmonizing color will be exposed at the other of said openings.

3. A device of the class described having color scales arranged side by side, a movable shield having an opening therein exposing the colors of said scales, and a slidable frisket having a plurality of openings with borders of different colors, said last openings being adapted to aline with said first opening to give a ground color for the exposed colors.

4. A device of the class described having a plurality of color scales, a movable shield having openings therein adapted to expose a part of said scales, and a movable frisket having a plurality of openings with differently colored edges.

In testimony whereof I have signed my name to this specification in the presence of two subscribing witnesses.

EMANUEL FREDERICK WAGNER.

Witnesses:
FRANK A. BATZ,
EMIL J. FUHRMANN.